T. LENNOX.
DISPLAY APPARATUS.
APPLICATION FILED APR. 10, 1909.
947,828.
Patented Feb. 1, 1910.
2 SHEETS—SHEET 1.
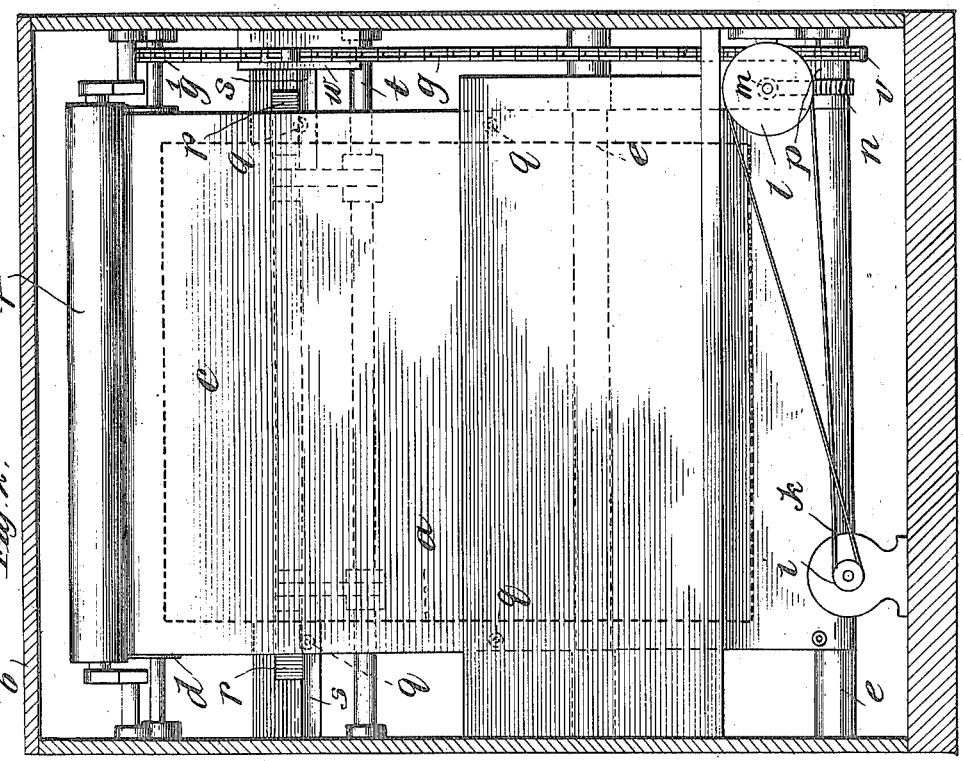
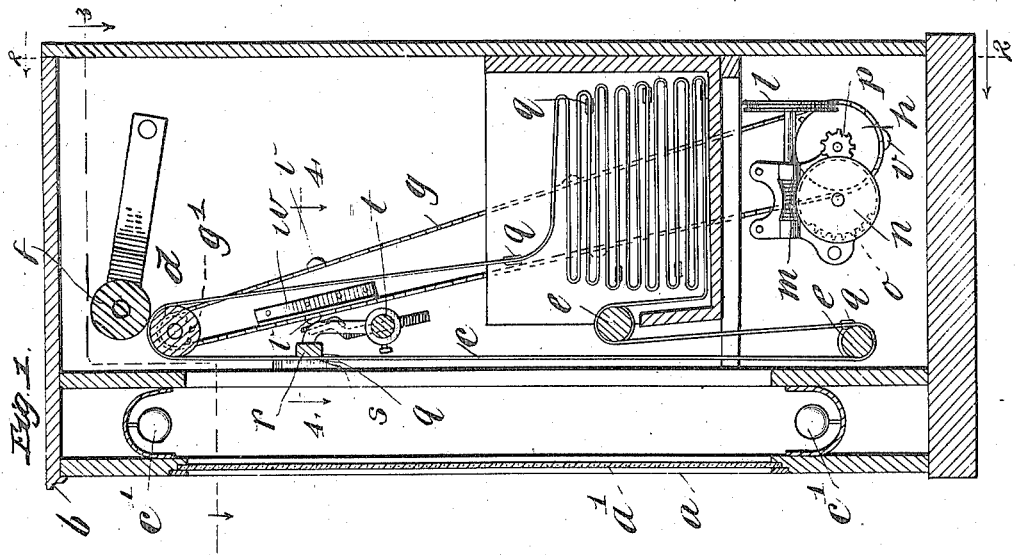
Witnesses:
Inventor:
Talbot Lennox,
By G. L. Cragg
Atty

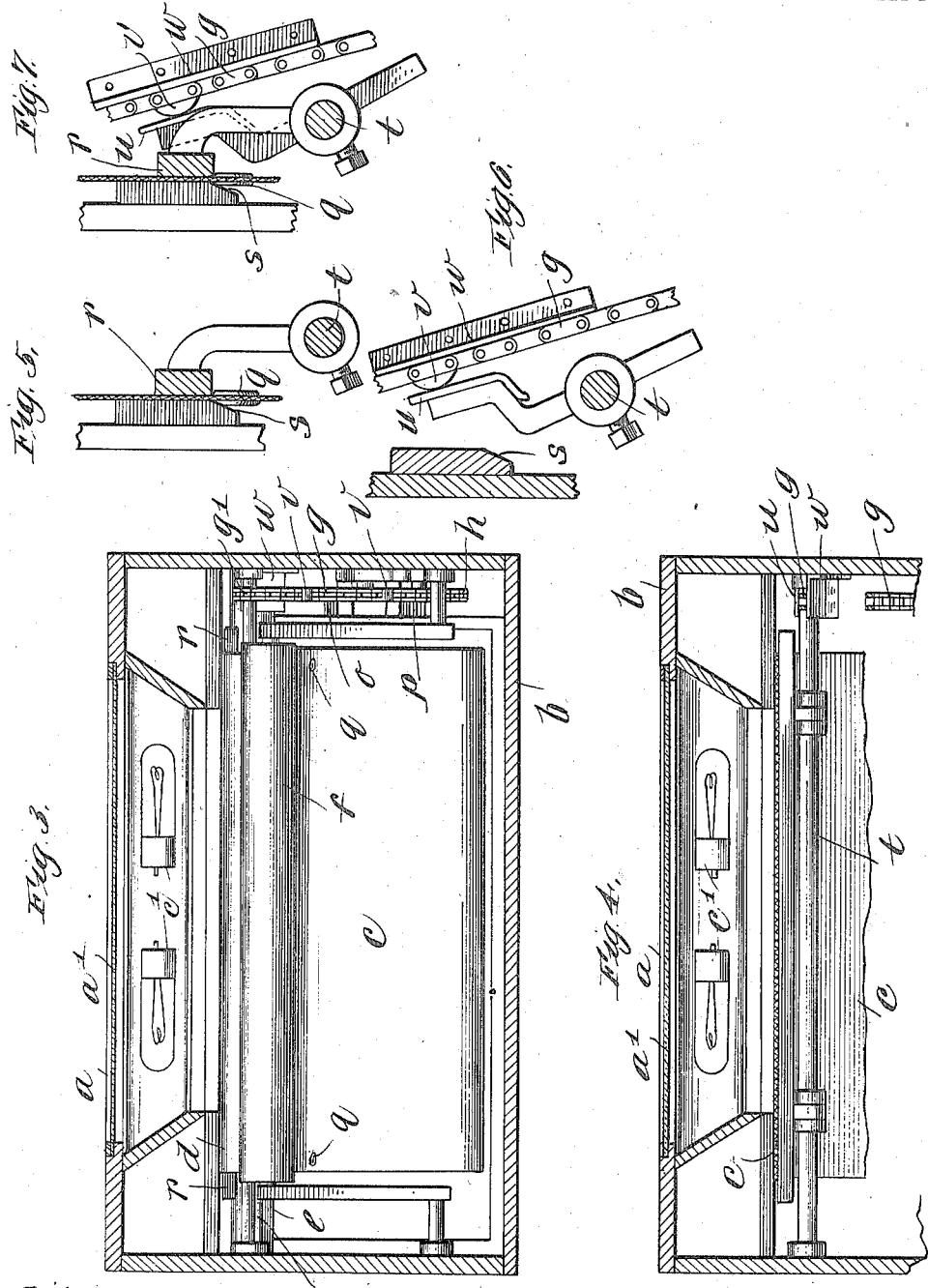

UNITED STATES PATENT OFFICE.

TALBOT LENNOX, OF CHICAGO, ILLINOIS, ASSIGNOR OF ONE-HALF TO ARTHUR B. HIGMAN AND ONE-HALF TO ALONZO L. LOOMIS, OF BENTON HARBOR, MICHIGAN.

DISPLAY APPARATUS.

947,828.           Specification of Letters Patent.        Patented Feb. 1, 1910.

Application filed April 10, 1909. Serial No. 489,067.

*To all whom it may concern:*

Be it known that I, TALBOT LENNOX, citizen of the United States, residing at Chicago, in the county of Cook and State of Illinois, have invented a certain new and useful Improvement in Display Apparatus, of which the following is a full, clear, concise, and exact description, reference being had to the accompanying drawings, forming a part of this specification.

My invention relates to display apparatus whereby a traveling belt containing matter to be displayed may be intermittently arrested in its movement, so that sufficient time may be given to observe each area of matter to be displayed, the machine of my invention including means whereby the movements of the display belt are so timed and controlled that each individual area of display matter will be in register with the display opening before which the display belt travels, the mechanism being such that in the event of the display areas being out of register with the display opening when the belt stops, said display areas will ultimately be brought into register with the display opening in the continued operation of the apparatus. By means of this mechanism, the display belt may carry many distinct signs contained in areas that are distinct from each other, and which areas may be successively presented before and in register with the display opening in the cabinet containing the structure, it being impossible for the display areas to continue to be out of register with the display opening if the machine is sufficiently continued in its intermittent operation.

In practicing my invention, I preferably employ mechanism which causes travel of the display belt and braking or checking traveling mechanism, which, in the normal operation of the machine, causes the belt to cease in its travel before the mechanism operating to cause the travel of the belt has ceased to work, slippage occurring between the mechanism that causes the travel of the belt and the belt when the braking mechanism is applied to stop the travel of the belt.

In the preferred embodiment of the invention, a part of the braking mechanism is carried upon the belt itself, this part coacting with the balance of the braking mechanism to check the travel of the belt. If the part of the braking mechanism carried by the belt structure is not in proper position with respect to the balance of the braking mechanism, the mechanism that causes the travel of the belt (which mechanism acts intermittently) will occasion a movement of the belt greater than the normal movement, one, two or other sufficient number of extended intermittent movements of the display belt thus being adapted to occur, again to restore the normal relation of the part of the braking mechanism carried by the display belt and the balance of the braking mechanism. The portion of the braking mechanism carried by the belt is subdivided into a plurality of elements distributed along the length of the belt, the distance between the adjacent braking elements longitudinally of the belt being equal to the distance covered by the belt in each of its normal step-by-step movements.

I will explain my invention more fully by reference to the accompanying drawings, showing the preferred embodiment thereof, in which—

Figure 1 is a side sectional elevation of the machine of my invention including the cabinet containing the same. Fig. 2 is a view of the structure on line 2 2 of Fig. 1. Fig. 3 is a sectional plan view of the structure on line 3 3 of Fig. 1. Fig. 4 is a sectional plan view of a part of the structure on line 4 4 of Fig. 1. Fig. 5 is a sectional elevation showing an element of the braking mechanism carried upon the display belt and a coöperating portion of the braking mechanism. Fig. 6 is a sectional elevation illustrating the mechanism that is employed for bringing the brake into and out of action. Fig. 7 is a view showing the relationship of the parts illustrated in Figs. 5 and 6.

Like parts are indicated by similar characters of reference throughout the different figures.

The operating parts of the structure of my invention are located in the rear of a display opening $a$, which, in the embodiment of the invention illustrated, is contained in the front face of a cabinet $b$ that houses the apparatus, a pane of glass $a^1$ being illustrated in the display opening for the purpose of completing the housing for the operating mechanism. The display belt c, in the embodiment of the invention illustrated, is caused to travel vertically upward by the mechanism to be described, the forward stretch of the belt c being located a sufficient distance to the rear of the display opening a as to permit of the interposition of suitable illuminating devices, such as electric lamps $c^1$, between the display opening and the display belt. The belt is caused to travel upward by means of a positively driven roller d actuated in the manner to be hereinafter described, idler-rollers e serving to direct the belt in its movement while a presser-roller f bearing upon a part of the belt c as it passes over the roller d, serves to maintain suitable engagement between the belt and the actuating roller d to cause the actuating roller to effect the travel of the belt while permitting slippage between the belt and the roller d when the belt is arrested in its movement by the travel-checking or braking mechanism, for the purpose which has been outlined. The operating roller d is driven by a sprocket-chain g engaging a sprocket-wheel $q^1$ upon the roller d and a sprocket-wheel h intermittently driven by a suitable motor i, preferably an electric motor, which is brought into driving relation with the sprocket-wheel h by means of the parts now to be described. The motor i drives a belt k passing over a driving-pulley l, whose shaft carries a worm m that is in continued constant engagement with a worm-wheel n. The shaft of this worm-wheel n carries a gear-wheel o which has a limited number of teeth upon its periphery. This gear-wheel o is in coöperative relation with a pinion p.

The elements o and p form parts of a suitable intermittent gearing whose construction is so well understood by those skilled in the art as not to require particular explanation nor illustration. Any suitable form of intermittent gearing may be interposed between the shaft of the worm-wheel n and the sprocket-wheel h, and I do not, therefore, wish to be limited to the precise form of intermittent gearing illustrated.

The gear-wheel h, by being intermittently rotated, thus effects intermittent movement of the sprocket-chain g, and thereby intermittent rotation of the roller d. The length of the peripheral travel of the roller d and the lineal travel of the chain g exceeds the length of the display areas measured longitudinally of the belt and the length of the display opening before which the belt appears, for the purpose which has been stated and which will be further elucidated.

In order that each entire movement of the sprocket-chain g may not be fully imparted to the display belt, in the normal operation of the machine, I employ mechanism to bring about an operative dissociation of the display belt from the chain g and the roller d when a sufficient movement of the display belt c has taken place, properly to present the area to be displayed before the display opening. In practicing this feature of my invention, I desirably employ braking mechanism, a part of which is disposed upon the longitudinal edges of the belt c, which part is subdivided into elements q which may be in the form of bulging eyelets, the spaces between adjacent bulging eyelets on each side of the display belt being equal to each intermittent movement that is to be imparted to the display belt. The balance of the braking mechanism includes a bar r extending across the display opening and behind the display belt and adapted to be moved toward and from the display belt, serving, when moved toward the display belt, to press the same toward bearing-plates s, so that the rising eyelets will be prevented from passing between the elements r and s, thereby temporarily to check the upward movement of the display belt sufficiently long to permit the display area appearing before the display opening properly to be observed, and serving, when moved away from the display belt, to permit of the passage of the adjacent eyelets between the elements r and s, so that the next intermittent movement of the display belt may occur. The brake-bar r is carried upon and is in fixed relation to a rock-shaft t, which rock-shaft also carries a shoe u that is likewise in fixed relation with the rock-shaft. The chain g carries a series of projections v that are adapted to ride upon the shoe u, so as to force the forward movement of said shoe, and thereby such a rotary movement of the rock-shaft t as will bring the brake-bar r against the belt c, for the purpose which has been stated. In order that the projections v may be adapted to this purpose, I locate behind the chain g a resisting-plate w which prevents the chain g from bulging toward the rear during the time an enlargement v is passing over the shoe u.

By means of the transmission mechanism intervening between the motor i and the chain g, it is very apparent that each intermittent movement of the periphery of the roller d accompanying intermittent movement of the chain g is in excess of each display area, that is, in excess of the distance between adjacent buttons upon a side of the belt c, so that it will be apparent that the element u of the braking mechanism must have a vertical dimension sufficiently great to permit of continued engagement between an enlargement v and the element u during the time that the chain g and roller d are finishing their excess movements, that is, during the time the chain *g* and the roller *d* are moving after the display belt *c* has been stopped. I have thus made it clear how the display belt *c* is arrested in its movement while the chain *g* and the roller *d* are allowed to continue in their movements to a slight extent, the purpose of which will now more fully appear. If for any reason, the belt *c* should be prematurely checked in its movement so as to prevent the eyelets or buttons *q* from reaching the elements *r* and *s* before the travel of the chain *g* has stopped, or if there should be some slippage between the roller *d* and the display belt *c* during the time the said display belt *c* should be moving, subsequent movements (one or more, as may be necessary) of the chain *g* will, by reason of the excess of such movements, bring the buttons into their normal positions respecting the elements *r* and *s*, so that though the display areas may for a time be out of register with the display opening, they will gradually be brought into register. In practice, I find that a peripheral travel of the roller *d* and the longitudinal travel of the sprocket-chain *g* three-fourths of an inch in excess of the normal intermittent movement of the display belt *c* is sufficient to preserve or restore the normal relation of the display belt *c* and the display opening behind which the belt is located.

The belt *c* is preferably endless, as I am thereby enabled to cause it to travel uniformly in one direction. The belt may be permitted to lie in folds, as indicated at the rear of the structure, it being unnecessary to provide any special means for taking up the slack in the belt.

It is obvious that many changes may be made in the embodiment of my invention herein shown and specifically described without departing from the spirit thereof, and I do not, therefore, wish to be limited to the precise construction shown, as changes may readily be made without departing from the spirit of my invention.

Having thus described my invention, I claim as new and desire to secure by Letters Patent:—

1. A display apparatus including a belt to be displayed, an operating roller engaging the belt for effecting the travel thereof, mechanism for causing the intermittent rotation of said roller, braking mechanism, and means for intermittently causing the same to operate upon the belt to be displayed during a part of the time the roller is in operation, the belt being adapted to have slippage with respect to the roller when the braking mechanism is in operation, whereby said belt is arrested in its movement, said braking mechanism having a part provided upon the belt, which part is subdivided into elements distributed longitudinally of the belt and spaced apart substantially to check the extent of each intermittent movement that the belt is to have, one of said elements being engaged by a complemental portion of the braking mechanism when said braking mechanism is operated in order to arrest the movement of the belt.

2. A display apparatus including a belt to be displayed, an operating roller engaging the belt for effecting the travel thereof, mechanism for causing the intermittent rotation of said roller, braking mechanism, and means for intermittently causing the same to operate upon the belt to be displayed during a part of the time the roller is in operation, the belt being adapted to have slippage with respect to the roller when the braking mechanism is in operation, whereby said belt is arrested in its movement.

3. A display apparatus including a belt to be displayed, an operating roller engaging the belt for effecting the travel thereof, braking mechanism, and means for intermittently causing the same to operate upon the belt to be displayed during a part of the time the roller is in operation, the belt being adapted to have slippage with respect to the roller when the braking mechanism is in operation, whereby said belt is arrested in its movement, said braking mechanism having a part provided upon the belt, which part is subdivided into elements distributed longitudinally of the belt and spaced apart substantially to check the extent of each intermittent movement that the belt is to have, one of said elements being engaged by a complemental portion of the braking mechanism when said braking mechanism is operated in order to arrest the movement of the belt.

4. A display apparatus including a belt to be displayed, an operating roller engaging the belt for effecting the travel thereof, braking mechanism, and means for intermittently causing the same to operate upon the belt to be displayed during a part of the time the roller is in operation, the belt being adapted to have slippage with respect to the roller when the braking mechanism is in operation, whereby said belt is arrested in its movement.

5. A display apparatus including a belt to be displayed, intermittently operating means for effecting intermittent movement of the belt, and means for arresting the intermittent movements of the belt during a part of the time the aforesaid means is in action, the belt having slippage with respect to the means that causes the belt to travel when the movement of the belt is arrested by the second aforesaid means.

6. A display apparatus including a belt to be displayed, means for effecting travel of the belt, and intermittently operating means for arresting the travel of the belt during a part of the time the aforesaid means is in action the belt having slippage with respect to the means that causes the belt to travel when the movement of the belt is arrested by the second aforesaid means.

In witness whereof, I hereunto subscribe my name this 8th day of April A. D., 1909.

TALBOT LENNOX.

Witnesses:
G. L. CRAGG,
L. G. STROH.